US011981790B2

(12) United States Patent
Sakakibara et al.

(10) Patent No.: US 11,981,790 B2
(45) Date of Patent: May 14, 2024

(54) CARBON BLACK AND METHOD FOR PRODUCING CARBON BLACK

(71) Applicant: TOKAI CARBON CO., LTD., Tokyo (JP)

(72) Inventors: Akihiro Sakakibara, Tokyo (JP); Yuki Kubota, Tokyo (JP); Keisuke Osamura, Tokyo (JP)

(73) Assignee: Tokai Carbon Co. Ltd., Tokyo (JP)

( * ) Notice: Subject to any disclaimer, the term of this patent is extended or adjusted under 35 U.S.C. 154(b) by 0 days.

(21) Appl. No.: 17/907,765

(22) PCT Filed: Aug. 13, 2021

(86) PCT No.: PCT/JP2021/029822
§ 371 (c)(1),
(2) Date: Aug. 29, 2022

(87) PCT Pub. No.: WO2022/208924
PCT Pub. Date: Oct. 6, 2022

(65) Prior Publication Data
US 2023/0323073 A1  Oct. 12, 2023

(30) Foreign Application Priority Data

Apr. 2, 2021 (JP) ................................. 2021-063300

(51) Int. Cl.
*C08K 3/04* (2006.01)
*C09C 1/50* (2006.01)
*C09C 1/58* (2006.01)

(52) U.S. Cl.
CPC .................. *C08K 3/04* (2013.01); *C09C 1/50* (2013.01); *C09C 1/58* (2013.01); *C01P 2002/82* (2013.01); *C01P 2002/86* (2013.01); *C01P 2006/12* (2013.01); *C01P 2006/19* (2013.01); *C08K 2201/006* (2013.01)

(58) Field of Classification Search
CPC ................................................ C08K 3/04–046
See application file for complete search history.

(56) References Cited

U.S. PATENT DOCUMENTS

2011/0207872 A1   8/2011   Schinkel et al.

FOREIGN PATENT DOCUMENTS

| CN | 105647242 A | 6/2016 |
| JP | 6140915 B2 | 6/2017 |

OTHER PUBLICATIONS

Chinese Office Action, Chinese Patent Application No. 202180029456.9, dated Dec. 26, 2023, pp. 17.

*Primary Examiner* — Alexandre F Ferre
(74) *Attorney, Agent, or Firm* — Hoffmann & Baron, LLP (57) ABSTRACT

A carbon black wherein a nitrogen adsorption specific surface area ($N_2SA$) is 25 to 60 $m^2/g$, a DBP absorption number is 90 to 180 $cm^3/100$ g, a ratio of the nitrogen adsorption specific surface area ($N_2SA$) to an iodine adsorption number (IA) ($N_2SA/IA$) is $1.10 \times 10^3$ to $1.50 \times 10^3$ $m^2/g$, a hydrogen content by NMR is 150 to 250 /g, and ΔD is 260 to 290 $cm^{-1}$.

5 Claims, 4 Drawing Sheets

CARBON BLACK AND METHOD FOR PRODUCING CARBON BLACK

CROSS-REFERENCE TO RELATED APPLICATIONS

This application is the National Stage of International Application No. PCT/JP2021/029822, filed Aug. 13, 2021, which claims the benefit of Japanese Application No. 2021-063300, filed Apr. 2, 2021, the contents of which is incorporated by reference herein.

TECHNICAL FIELD

The present invention relates to a carbon black and a method for producing the same.

BACKGROUND ART

A carbon black is used in various applications, and is mainly used as a filler for reinforcing a rubber member. In this case, it is known that it is important to uniformly disperse a carbon black in a rubber member in order to sufficiently give reinforcement to the rubber member.

Various technical modifications have conventionally been conducted for improving the dispersibility of a carbon black to enhance the reinforcement of rubber members. For example, Patent Literature 1 discloses a carbon black that has a favorable dispersibility in a rubber mixture and has very high reinforcing action and a slight hysteresis. It is stated that the invention described in Patent Literature 1 can solve that the above-described problems by using a carbon black in which the CTAB surface area, the COAN, and the total value of the OAN and the COAN are within predetermined numerical value ranges, respectively.

CITATION LIST

Patent Literature

Patent Literature 1: Japanese Patent No. 6140915

SUMMARY OF THE INVENTION

Problems to be Solved by the Invention

In these years, the cases where rubber members are used under harsh environments have been increasing. As a result, there is a demand also for a carbon black to have a further improved reinforcement for rubber members.

Hence, an object of the present invention is to provide a carbon black that can further reinforce a rubber member when blended with the rubber member, and a method for producing the same.

Solution to Problem

The present inventors have found that the above-described problem can be solved by regulating the respective values of the nitrogen adsorption specific surface area (hereinafter referred to as $N_2SA$), the DBP absorption number, the ratio of the $N_2SA$ to the iodine adsorption number (hereinafter referred to as IA) (hereinafter referred to as $N_2SA/IA$), the hydrogen content (/g), and the full width at half maximum $\Delta D$ ($cm^{-1}$) of the Raman scattering peak of the carbon black within specific ranges, respectively.

Specifically, the present invention contains the following matters.

[1] A carbon black wherein
a nitrogen adsorption specific surface area ($N_2SA$) is 25 to 60 $m^2/g$,
a DBP absorption number is 90 to 180 $cm^3/100$ g,
a ratio of the nitrogen adsorption specific surface area ($N_2SA$) to an iodine adsorption number (IA) ($N_2SA/IA$) is $1.10\times10^3$ to $1.50\times10^3$ $m^2/g$,
when a nuclear magnetic resonance signal of a spin-spin relaxation process observed by a solid echo method is represented by a sum of a first signal and a second signal having a larger time constant than that of the first signal, a hydrogen content represented by a signal intensity per unit mass at time 0 of the first signal is 150 to 250/g, and
when an excitation wavelength is set at 532 nm, a full width at half maximum $\Delta D$ of a Raman scattering peak appearing within a range of 340 to 1360 $cm^{-1}$ is 260 to 290 $cm^{-1}$.

[2] The carbon black according to [1], wherein the DBP absorption number is 90 to 150 $cm^3/100$ g.

[3] The carbon black according to [1] or [2], wherein the $N_2SA/IA$ is $1.20\times10^3$ to $1.50\times10^3$ $m^2/g$.

[4] The carbon black according to any one of [1] to [3], for a filler for a rubber member.

[5] The carbon black according to [4], that is to be added in an amount of 10 to 170 parts by mass relative to 100 parts by mass of a rubber component in the rubber member.

[6] A method for producing a carbon black, comprising:
a reaction step of incompletely combusting a hydrocarbon, which is a raw material, in a reaction furnace to generate a carbon black raw material;
a granulation step of granulating the carbon black raw material such that particles of the carbon black raw material have a predetermined size; and
a drying step of dehydrating and drying the carbon black raw material thus granulated, wherein
the reaction step is conducted in a reaction zone between a position where a coolant is introduced and a position where a cooling liquid is introduced in the reaction furnace,
the coolant is introduced such that a temperature in the reaction zone becomes 800 to 900° C., and
the cooling liquid is introduced such that a residence time of the carbon black raw material in the reaction zone becomes 20 to 30 msec, to stop reaction of the carbon black raw material.

The present invention provides a carbon black that can increase a tensile product of a rubber as compared with the conventional techniques when blended with a rubber member, and a method for producing the same.

DESCRIPTIONS OF EMBODIMENTS

Hereinafter an embodiment of the present invention will be described.

A carbon black according to the present embodiment is used as a filler to be added to a rubber member. The carbon black according to the present embodiment is used to reinforce a rubber member. Note that hereinafter, the statement "reinforce" the rubber member means increasing the product of the tensile strength and the tensile elongation of the rubber member, that is, the value of the tensile product of the rubber member.

In general, in terms of enhancing the reinforcement of a rubber member with a carbon black, when the surface activity of the carbon black is high, the interaction of the carbon black with the rubber is facilitated, and higher reinforcement of the rubber member is expected. However, in reality, if the surface activity of the carbon black is increased, particles of the carbon black are more likely to homo-aggregate, making it difficult to uniformly disperse the carbon black. As a result, the reinforcing effect by the carbon black cannot be sufficiently exhibited.

In view of this, the present inventors paid attention to the "hydrogen content" and the "crystallinity" of a carbon black. These properties affect the easiness of interaction with rubbers and aggregation property of the carbon black. Hence, the present inventors considered that it was possible to simultaneously achieve an improvement in the easiness of interaction and high dispersibility by regulating these properties within predetermined ranges.

In addition, the present inventors paid attention to both macro dispersibility and micro dispersibility in terms of the dispersibility. Then, the present inventors adjusted values of the "hydrogen content" and the "crystallinity" so as to achieve favorable dispersibility in both macro and micro scales. As a result, the present inventors found that it was possible to obtain a carbon black that is excellent in dispersibility while having a high surface activity, and consequently to further reinforce a rubber member.

Specifically, a carbon black according to the present embodiment has the following matters.

(A) A nitrogen adsorption specific surface area ($N_2SA$) is 25 to 60 $m^2/g$.
(B) A DBP absorption number is 90 to 180 $cm^3/100$ g.
(C) A ratio of the nitrogen adsorption specific surface area ($N_2SA$) to the iodine adsorption number (IA) ($N_2SA/IA$) is $1.10 \times 10^3$ to $1.50 \times 10^3$ $m^2/g$.
(D) When a nuclear magnetic resonance signal of a spin-spin relaxation process observed by a solid echo method is represented by a sum of a first signal and a second signal having a larger time constant than that of the first signal, a hydrogen content represented by a signal intensity per unit mass at time 0 of the first signal is 150 to 250 (/g).
(E) When the excitation wavelength is set at 532 nm, the value of the full width at half maximum ΔD of a Raman scattering peak appearing within a range of 1340 to 1360 $cm^{-1}$ is 260 to 290 $cm^{-1}$.

Since the carbon black according to the present embodiment has the above-described matters, the carbon black is favorably dispersed both microscopically and macroscopically when added to a rubber member as a filler. As a result, it is possible to improve the tensile product of the rubber member.

Hereinafter, the matters specifying the carbon black according to the present embodiment will be described in detail.

(A) $N_2SA$: 25 to 60 $m^2/g$

The $N_2SA$ is a value representing the specific surface area of the carbon black with the amount of nitrogen molecules adsorbed per unit mass of the carbon black ($m^2/g$). In addition, the $N_2SA$ can be obtained by the method described in JIS K 6217-7:2013 "Testing methods of fundamental characteristics of carbon black for rubber industry" (reference ASTM D6556-16).

The $N_2SA$ is preferably 25 to 60 $m^2/g$. When the $N_2SA$ is 25 $m^2/g$ or more, a high reinforcement can be achieved. In addition, when the $N_2SA$ is 60 $m^2/g$ or less, homo-aggregation of particles of the carbon black can be suppressed to achieve a high dispersibility.

The $N_2SA$ is further preferably 30 $m^2/g$ to 55 $m^2/g$ from the viewpoint of achieving reinforcement and dispersibility.

(B) DBP Absorption Number: 90 to 180 $cm^3/100$ g.

The DBP absorption number is a value representing the structure of a carbon black with the amount of DBP (dibutyl phthalate) absorbed relative to 100 g of the carbon black ($cm^3/100$ g).

The DBP absorption number can be obtained in accordance with JIS K 6217-1997 "Testing methods of fundamental characteristics of carbon black for rubber industry".

The void ratio among aggregates of a carbon black has a positive correlation with the structure of the carbon black. Hence, the larger the value of the DBP absorption number is, the more the structure of the carbon black has developed.

The DBP absorption number is preferably 90 to 180 $cm^3/100$ g. When the DBP absorption number is 90 $cm^3/100$ g or more, a high dispersibility can be achieved. In addition, when the DBP absorption number is 180 $cm^3 100$ g or less, a high reinforcement can be achieved.

The DBP absorption number is further preferably 150 $cm^3/100$ g or less from the viewpoint of achieving a favorable processability and a high reinforcement.

Moreover, the invention of the present application can be implemented by regulating the numerical value ranges of the $N_2SA$ and the DBP absorption number to predetermined ranges as follows as long as the solution to the problem to be solved by the invention of the present application is provided.

For example, it is possible to increase the interaction between the carbon black and the rubber by setting the $N_2SA$ of the carbon black to a value slightly higher than the center of the above-described further preferable range, and to increase the tensile product of the rubber member when the carbon black is added to the rubber by setting the DBP absorption number of the carbon black to a value slightly lower than the center of the above-described preferable range, thus imparting a higher reinforcement to the rubber member. In this case, it is preferable to set the $N_2SA$ within a range of 49 $m^2/g$ or more and 55 $m^2/g$ or less and the DBP absorption number within a range of 115 $cm^3/100$ g or more and 135 $cm^3/100$ g or less.

In addition, for example, it is possible to suppress homo-aggregation of particles of the carbon black by setting the $N_2SA$ of the carbon black to a value near the center of the above-described further preferable range, and to increase the tensile product of the rubber member when the carbon black is added to the rubber by setting the DBP absorption number of the carbon black to a value slightly lower than the center of the above-described preferable range, thus achieving both a favorable dispersibility in the rubber and a high reinforcement. In this case, it is preferable to set the $N_2SA$ within a range of 35 m²/g or more and 47 m²/g or less and the DBP absorption number within a range of 115 cm³/100 g or more and 132 cm³/100 g or less.

Moreover, for example, it is possible to strongly suppress homo-aggregation of particles of the carbon black by setting the $N_2SA$ of the carbon black to a value slightly lower than the center of the above-described further preferable range, and to achieve a large shear force when the carbon black is added to and kneaded with the rubber by setting the DBP absorption number of the carbon black to a value slightly higher than near the center of the preferable range, thus achieving a more favorable dispersibility in the rubber. In this case, it is preferable to set the $N_2SA$ within a range of 28 m²/g or more and 34 m²/g or less and the DBP absorption number within a range of 133 cm³/100 g or more and 141 cm³/100 g or less.

(C) $N_2SA/IA$: $1.10 \times 10^3$ to $1.50 \times 10^3$ m²/g

The IA is a value representing the specific surface area of the carbon black with the amount of iodine molecules adsorbed per unit mass of the carbon black in a liquid phase (mg/g). Although the IA is an index representing the specific surface area of the carbon black like the $N_2SA$, the IA is a value also dependent on the amount of surface functional groups of the carbon black (the higher the amount of acidic functional groups is, the less likely the iodine molecules are to be adsorbed, so that the IA takes a value slightly lower than the $N_2SA$).

The IA can be obtained in accordance with JIS K 6217-1997 "Testing methods of fundamental characteristics of carbon black for rubber industry".

A value obtained by dividing the value of the $N_2SA$ by the value of the IA is an index representing the surface activity of the carbon black. Here, the value of the $N_2SA/IA$ is calculated while the unit of the value of the $N_2SA$ is set to m²/g, and the unit of the value of the IA is set to mg/g. The larger the value of this $N_2SA/IA$ is, the larger the amount of surface functional groups of the carbon black is. When the amount of surface functional groups of the carbon black is large, chemical reaction is likely to occur via the surface functional groups in the surface of the carbon black, which facilitates the interaction with the rubber. That is, the value of the surface activity of the carbon black quantitatively indicates the likelihood of the occurrence of chemical reaction in the surface of the carbon black.

According to the present embodiment, since the $N_2SA/IA$ is $1.10 \times 10^3$ m²/g or more, it is possible to achieve reinforcement.

In addition, when the $N_2SA/IA$ is $1.50 \times 10^3$ m²/g or less, the production is also easy. Although the detail will be described later, a carbon black is produced, for example, by combusting a raw material oil to obtain raw material particles of the carbon black, followed by granulation. Here, the $N_2SA/IA$ can be increased by shortening the time for the combustion reaction. However, when the time for the combustion reaction is shortened too much, more uncombusted oil components are likely to remain, thus making it difficult to conduct the granulation. When the $N_2SA/IA$ is $1.50 \times 10^3$ m²/g or less, the reaction can be conducted under conditions with which uncombusted oil components are unlikely to remain during the production.

The $N_2SA/IA$ is preferably $1.20 \times 10^3$ m²/g or more from the viewpoint of facilitating interaction between the carbon black and the rubber, and achieving a higher reinforcement.

(D) The Hydrogen Content: 150 to 250/g

The hydrogen content indicates a hydrogen content obtained by NMR. The larger this value is, the more the hydrogen content is present in the surface of the carbon black. The present inventors considered that the hydrogen content present in the surface of the carbon black is involved in the easiness of interaction with the rubber and aggregation property of the carbon black, which thus affects the reinforcement and the dispersibility. When the hydrogen content present in the surface is large, the easiness of interaction between the carbon black and the rubber is increased, that is, aggregation (hetero-aggregation) between the carbon black and the rubber becomes more likely to occur to improve the dispersibility, so that the reinforcement is improved. On the other hand, when the hydrogen content present in the surface is too much, aggregation (homo-aggregation) among particles of the carbon black becomes more likely to occur to decrease the dispersibility, so that the reinforcement decreases. In view of these, as a result of studying the hydrogen content by NMR, the range of 150 to 250 was obtained.

The hydrogen content is preferably 150 to 240/g from the viewpoint of achieving the easiness of interaction with the rubber and a favorable dispersibility.

Specifically, the hydrogen content can be obtained by the following method.

(1) As a pulse nuclear magnetic resonance spectrometer, Minispec mq20 manufactured by Bruker Biospin is used, and the carbon black, which is a measurement target, is dried at 110° C. for 30 minutes, 0.2 g of the carbon black is put into a glass-made sample tube, as a measurement sample. A spin-spin relaxation time (transverse relaxation time) T2 is measured under the following measurement conditions to obtain a T2 relaxation curve (free induction decay curve).

<Measurement Condition>

Measurement nuclear species: 1H
Pulse mode: Solid echo method (90°x–τ–90° y)
90° pulse width: 2.7 μs
Measurement time: 2 ms
Wait time: 500 ms
Cumulated number: 52 times
Measurement temperature: 40° C.
Gain: 90

Since the mass of the carbon black is 0.2 g and is constant and the device function is also constant (Gainn=90), the signal intensity of the T2 relaxation curve (free induction decay curve) obtained fluctuates in proportion to the 1H concentration of the measurement target.

(2) The free induction decay curve thus obtained is subjected to fitting by a linear least-squares method using fitting software (TD-NMR-A for Windows 7) attached to the above-described pulse nuclear magnetic resonance spectrometer (Bruker Biospin Minispec mq20) to obtain an approximate curve represented by the following formula f(t).

$$f(t)=A(1)\exp(-t/T2(1))+A(2)\exp(-t/T2(2))$$

where T2(1) represents a relaxation time of a component having a short relaxation time, T2(2) represents a relaxation time of a component having a long relaxation time, A(1) represents a signal intensity at t=0 of the component having a short relaxation time, and A(2) represents a signal intensity at t=0 of the component having a long relaxation time.

(3) The above-described signal intensity A(1) is divided by the mass w (g) of the measurement sample.

Figure 1:
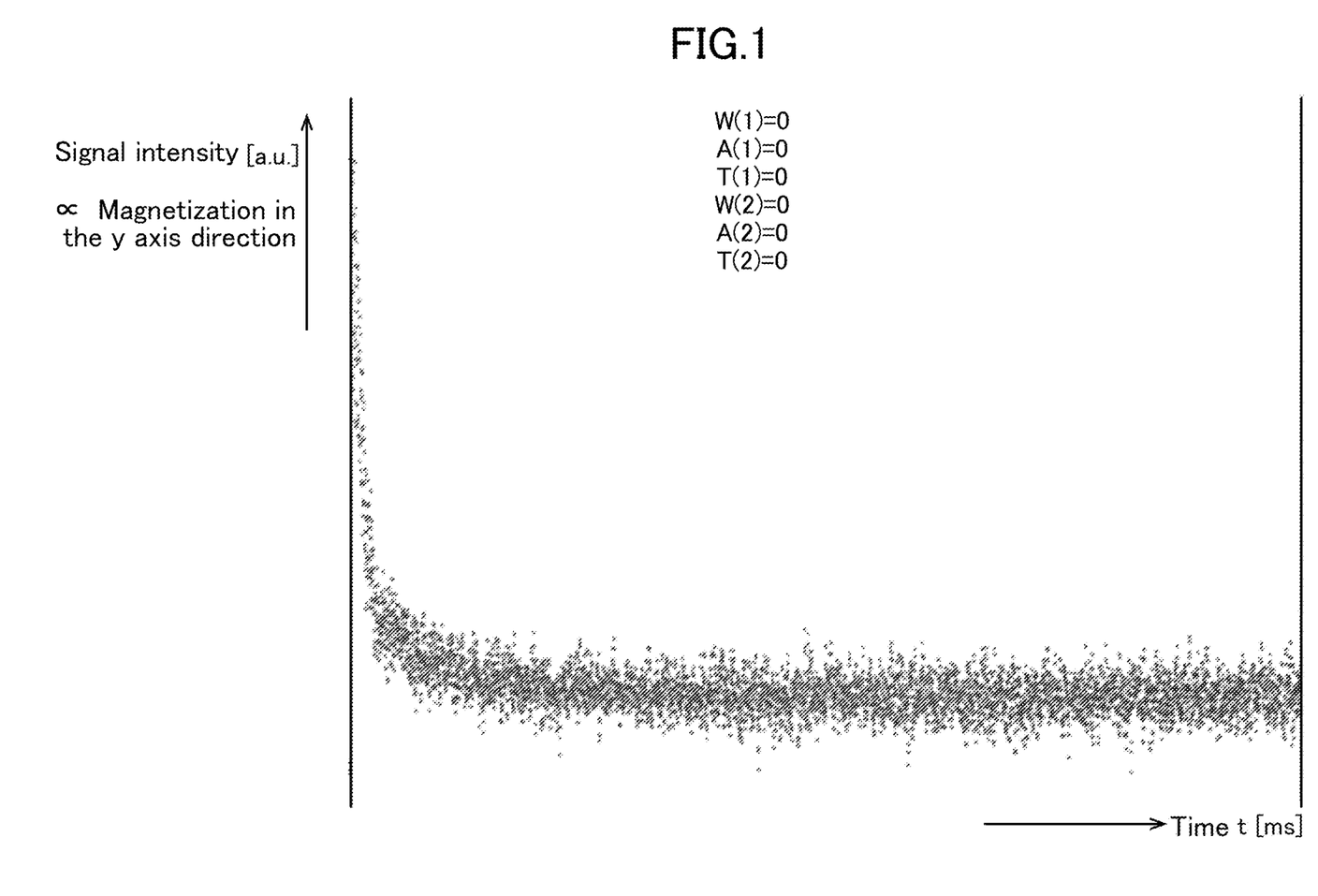
FIG. 1 is a diagram for explaining a method for calculating a hydrogen content.

As shown in FIG. 1, it is understood that when the time at which excitation occurs by the 90° pulse is regarded as t=0, a signal of which the magnetization (signal intensity) in the y axial direction attenuates with time is obtained. It should be noted that the graph shown in FIG. 1 is presented for explaining the method for calculating the hydrogen content by NMR, and is thus not a result of measuring the carbon black according to the present embodiment.

Figure 2:
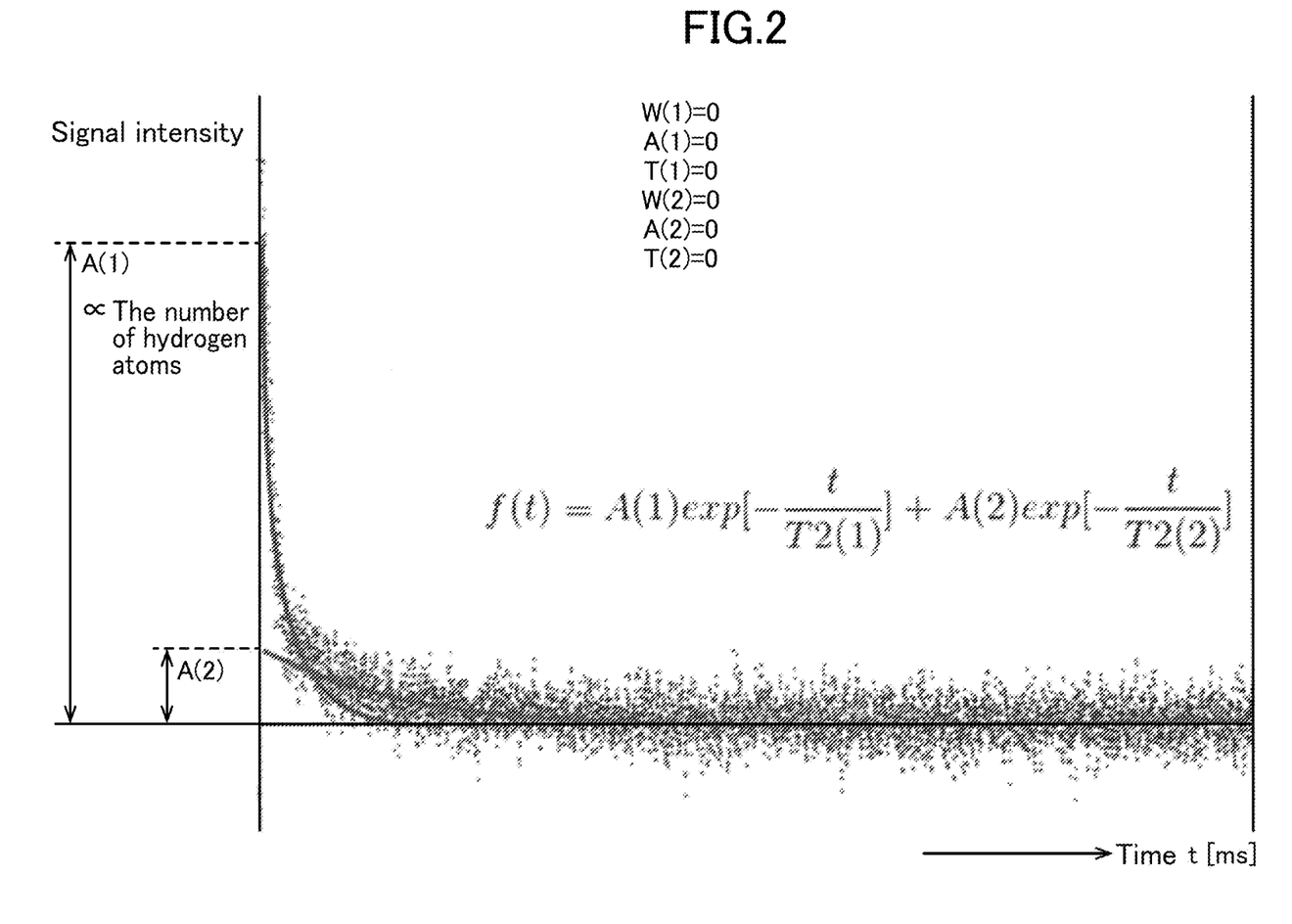
FIG. 2 is a diagram for explaining the method for calculating the hydrogen content.

FIG. 2 is a graph in which fitting curve obtained by fitting the T2 relaxation curve (free induction decay curve) shown in FIG. 1 by a linear least-squares method is shown with a solid line. As shown in FIG. 2, the T2 relaxation curve (free induction decay curve) thus obtained can be expressed as the sum of two exponential functions by the fitting.

Here, since a liquid and a solid can be distinguished by a difference in time constant, the signal intensity A(1) at t=0 (at the time of excitation by the 90° pulse) in the exponential function according to the component having a short relaxation time can be identified as hydrogen atoms in the surface of the carbon black (—COOH, —OH, —H in the surface, —H in the carbon-skeletons, and the like). Similarly, the signal intensity A(2) at t=0 (at the time of excitation by the 90° pulse) in the exponential function according to the component having a short relaxation time can be identified as a water content, liquid polycyclic aromatic hydrocarbon compounds, and the like adsorbed in the surface of the carbon black.

The hydrogen content "A(1)/w" per unit mass of the carbon black can be obtained by dividing the above-described signal intensity A(1) (a.u.) by the mass w (0.2 g) of the carbon black subjected to the measurement. Here, the carbon black based on which the measurement is conducted is SEAST 9 (trade name) produced by Tokai Carbon Co., Ltd., and has a hydrogen content of 114/g. That is, the hydrogen content of the measurement target sample is obtained while the measurement conditions that affect signal intensities are adjusted such that the hydrogen content of the SEAST 9 (trade name) produced by Tokai Carbon Co., Ltd. becomes 114/g.

According to the investigation by the present inventors, the hydrogen content represented by A(1)/w has been found to exhibit high correlation with the hydrogen content obtained by a thermal decomposition method, which is conventionally known as a method for measuring the hydrogen content in the surface of a carbon black, and thus can be favorably used as an index indicating the hydrogen content in the surface of the carbon black.

(E) Full Width at Half Maximum ΔD of Raman Scattering Peak: 260 to 290 $cm^{-1}$ ΔD is a full width at half maximum ($cm^{-1}$) of a peak having a peak top within a range of 1350±10 $cm^{-1}$ in a Raman spectrum obtained by measurement using a laser Raman spectrometer at an excitation wavelength of 532 nm.

In the above-described Raman spectrum, the peak having a peak top within a range of 1350±10 $cm^{-1}$ corresponds to the peak in the D band of the Raman spectrum.

According to the investigation by the present inventors, the full width at half maximum of the peak in the D band represents the degree of disorder of the crystal structure in the surface of the carbon black, that is, the crystallinity. The larger the value of ΔD is, the more disordered the crystal structure is (the lower the crystallinity is).

When the crystal structure is disordered (the crystallinity is low), there are many edges in the surface of the carbon black, that is, portions where functional groups exhibiting affinity with the rubber are formed, so that the easiness of interaction of the carbon black with the rubber is improved. As a result, the carbon black and the rubber are more likely to hetero-aggregate, so that the dispersibility is improved. On the other hand, when the crystallinity is too low, homo-aggregation among particles of the carbon black is more likely to occur, and the dispersibility is impaired on the contrary. In view of these, as a result of investigation so as to achieve an optimum crystallinity, ΔD of 260 to 290 was obtained.

That is, when the value of ΔD is 260 or more, hetero-aggregation is more likely to occur, a high dispersibility can be achieved, and as a result, the reinforcement is improved. In addition, when the value of ΔD is 290 or less, homo-aggregation is less likely to occur, a high dispersibility can be achieved, a high reinforcement can be achieved as well.

The value of ΔD is further preferably 260 to 280 $cm^{-1}$ from the viewpoint of achieving the easiness of interaction with the rubber and a favorable dispersibility.

Specifically, ΔD can be measured by the following method.

Figure 3:
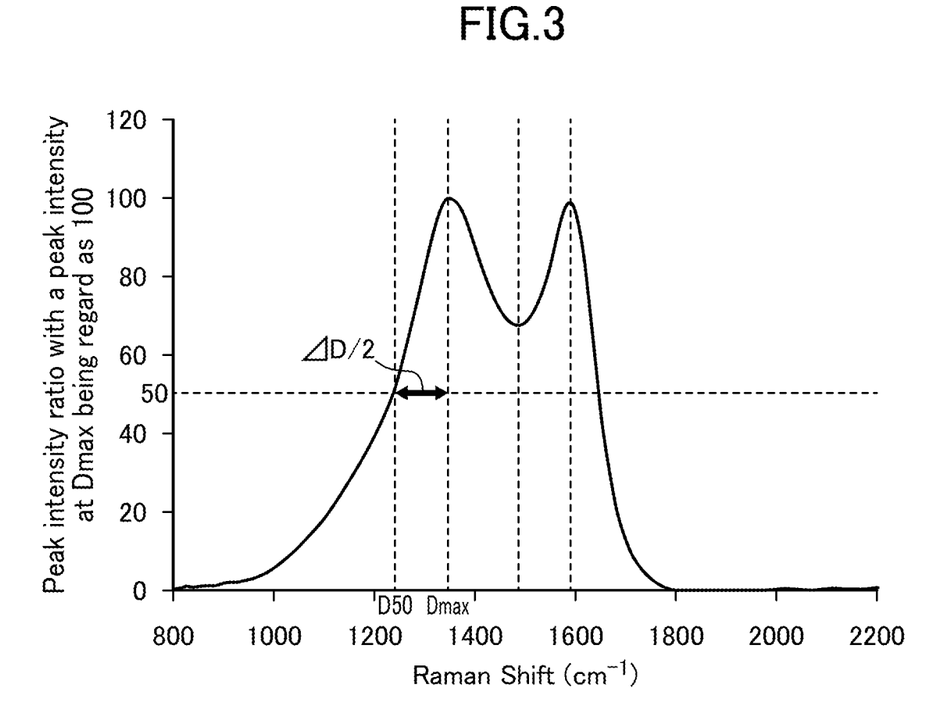
FIG. 3 is a diagram illustrating a method for calculating a full width at half maximum $\Delta D$ of a Raman scattering peak.

FIG. 3 is a diagram illustrating a method for calculating a value of ΔD. It should be noted that FIG. 3 is only presented for explaining the method for calculating ΔD, and is not a result of measurement of the carbon black according to the present embodiment.

As illustrated in FIG. 3, a peak having a peak top within a range of 1350±10 $cm^{-1}$ is detected in a Raman spectrum obtained by measuring a carbon black with laser Raman spectroscopy at an excitation wavelength of 532 nm.

Then, when the measurement wavelength at the above-described peak top position is set as Dmax ($cm^{-1}$), and the detection position on the low wavelength (low Raman shift) side, which has a detection intensity half the peak intensity at the above-described Dmax in the obtained ΔD spectrum is set as D50 ($cm^{-1}$), a value calculated by the following formula is used as ΔD ($cm^{-1}$).

$$\Delta D = (D\mathrm{max} - D50) \times 2$$

Here, the carbon black on which this measurement is based is SEAST G-SO (trade name) produced by Tokai Carbon Co., Ltd., and the value of ΔD thereof is 249 $cm^{-1}$. That is, ΔD of the measurement target sample is obtained while the measurement conditions that affect the value of ΔD are adjusted such that ΔD of SEAST 9 (trade name) produced by Tokai Carbon Co., Ltd. becomes 249 $cm^{-1}$.

(F) Other Specific Matters

The carbon black according to the present embodiment is used as a filler for reinforcing a rubber member as described above.

Here, the rubber member is not particularly limited, and the carbon black can be applied, for example, to general purpose rubbers such as natural rubber, styrene butadiene rubber, butadiene rubber, butyl rubber, ethylene propylene rubber, acrylonitrile-butadiene rubber, and chloroprene rubber, special purpose rubbers such as acrylic rubber, chlorosulfonated polyethylene rubber, urethane rubber, silicone rubber, and fluororubber, and rubber members obtained by mixing these. As the usages of rubber members for which the carbon black according to the present embodiment is used as a filler, various rubber members for automobiles and other general industries (weather-strips, hoses, belts, anti-vibration and damping rubbers, boots, sealing and packing materials), and the like are preferable. In automobiles, whose performances have been increasing, there are increasing cases where rubber members are used under harsh environments of a high temperature, a high pressure, and the like. In addition, reduction in size of rubber members due to the downsizing of units of automobiles, and reduction in thickness of rubber members due to reduction in weight of units of automobiles have been proceeding. As a result, it is becoming more difficult for the conventional carbon blacks to sufficiently impart reinforcements required for rubber members. The carbon black according to the present embodiment is useful in satisfying such demands for rubber members for automobiles.

In addition, it is preferable that the carbon black be blended in an amount of for example 10 to 170 parts by mass, and preferably 20 to 160 parts by mass, relative to 100 parts by mass of a rubber component.

(G) Method for Producing a Carbon Black

The carbon black according to the present embodiment can be obtained by incompletely combusting hydrocarbon raw materials and adjusting reaction conditions at this time as appropriate in accordance with a general method for producing a carbon black such as an oil furnace method. Hereinafter, an example of the method for producing a carbon black according to the present embodiment will be described.

Figure 4:
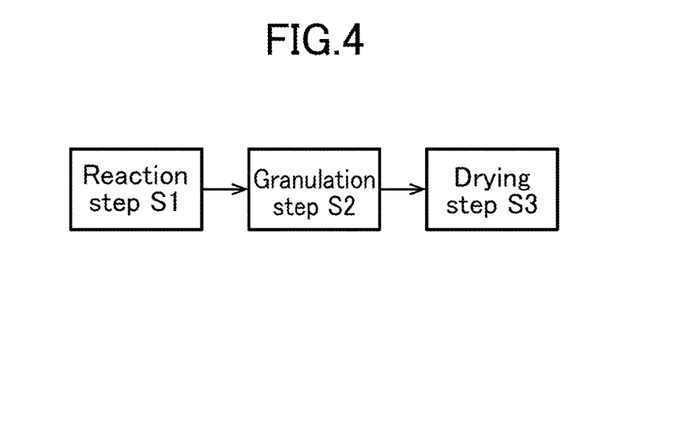
FIG. 4 is a block diagram illustrating a procedure of processing steps for producing a carbon black.
Figure 5:
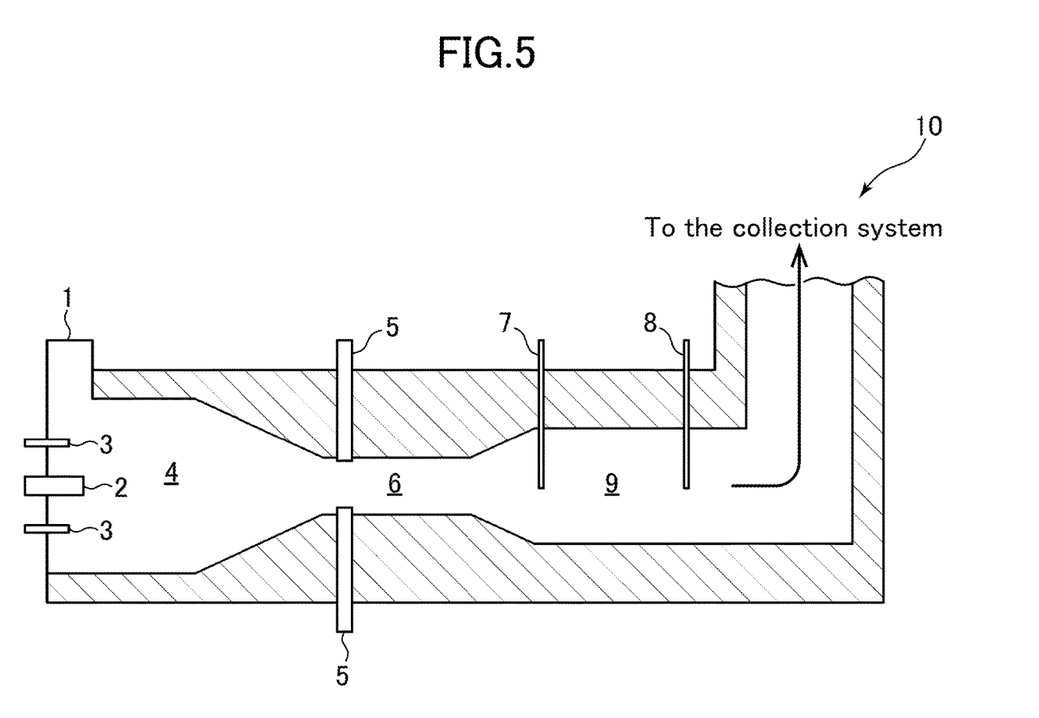
FIG. 5 is a schematic diagram illustrating an example of a reaction furnace.

FIG. 4 is a block diagram illustrating a procedure of processing steps for producing the carbon black as one embodiment of the present invention. FIG. 5 is a schematic diagram illustrating an example of a reaction furnace. The carbon black as one embodiment of the present invention can be produced by successively conducting reaction step S1, granulation step S2, and drying step S3 in this order as illustrated in FIG. 4.

First, in reaction step S1, a carbon black raw material is generated in a reaction furnace 10. As illustrated in FIG. 5, the reaction furnace 10 is cylindrical and includes a fuel combustion zone 4, a raw material inlet zone 6, and a reaction zone 9.

The fuel combustion zone 4 is a part to generate a high-temperature combustion gas. The fuel combustion zone 4 is provided with an oxygen-containing gas inlet port 1, a combustion burner 2, and an alkali metal salt·aqueous solution supply nozzle 3. From the oxygen-containing gas inlet port 1, an oxygen-containing gas (oxygen, air, or the like) is introduced into the fuel combustion zone 4. In addition, from the combustion burner 2, a fuel (FCC residual oil, hydrogen, carbon monoxide, natural gas, petroleum gas, or the like) is introduced into the fuel combustion zone 4. In this way, the high-temperature combustion gas is generated. From the alkali metal salt·aqueous solution supply nozzle 3, a carbonate, a chloride, a hydroxide, or the like of sodium, potassium, or the like is supplied as an alkali metal salt·aqueous solution into the fuel combustion zone 4. Adding the alkali metal salt·aqueous solution enables adjustment such that the structure of the carbon black does not develop in the raw material inlet zone 6. The combustion gas generated in the fuel combustion zone 4 is supplied to the raw material inlet zone 6.

The raw material inlet zone 6 is a part where the raw material oil is introduced. The raw material inlet zone 6 has a diameter smaller than that of the fuel combustion zone 4. To the raw material inlet zone 6, a raw material oil inlet nozzle 5 is connected. The raw material oil is introduced to the raw material inlet zone 6 through the raw material oil inlet nozzle 5, and is mixed with the combustion gas. At this time, minute cores of the carbon black are generated through thermal decomposition, and the cores collide with each other to form a predetermined structure, so that carbon black fine particles, which are a raw material of the carbon black, are generated. As the raw material oil, an aromatic hydrocarbon such as naphthalene or anthracene, a coal-based hydrocarbon such as creosote oil or tar oil, a petroleum-based heavy oil such as FCC residual oil or ethylene heavy end oil, or a hydrocarbon such as an acetylene-based unsaturated hydrocarbon, an aliphatic hydrocarbon such as hexane is used. A mixture of the combustion gas and the raw material oil is supplied to the reaction zone 9.

The reaction zone 9 is a part where the carbon black fine particles generated in the raw material inlet zone 6 are further sufficiently vapor-phase grown, and the reaction is stopped. The diameter of the reaction zone 9 is larger than the diameter of the fuel combustion zone 4. The flow speed of the carbon black fine particles generated in the raw material inlet zone 6 is reduced in the reaction zone 9 having the wider aperture. At this time, the aromatic hydrocarbon in the gas phase is carbonized and accumulated to grow on the surfaces of the carbon black fine particles, thus generating the carbon black raw material. The reaction zone 9 is provided with a coolant inlet nozzle 7, and a cooling liquid inlet nozzle 8 for stopping the reaction. The coolant inlet nozzle 7 is provided upstream of the cooling liquid inlet nozzle 8. From the coolant inlet nozzle 7, a coolant is supplied to the reaction zone 9 to control the temperature of the reaction zone 9. From the cooling liquid inlet nozzle 8, a cooling water is sprayed into the reaction zone 9, which stops the reaction of generating the carbon black raw material.

The carbon black raw material generated in the reaction zone 9 is transferred to a collection system, which is not illustrated, and is collected by a collection device such as a cyclone or a bag filter.

Subsequently, in the granulation step S2, the carbon black raw material is granulated such that the particles of the carbon black raw material are formed into a predetermined size. The specific mode of this granulation process is not particularly limited, and a publicly-known granulation method can be employed. The publicly-known granulation method includes, for example, a wet granulation method. An example of the wet granulation method is a method for granulating the material into a pellet shape having a predetermined size by rotating a shaft having a plurality of special bar-shaped pins spirally arranged in the center of the cylinder in a predetermined container at a high speed, and supplying carbon and water into the container, followed by agitating and mixing these.

Subsequently, in drying step S3, the carbon black raw material thus granulated is dried to dehydrate the carbon black raw material thus granulated to obtain a dried carbon black raw material. The specific mode of this drying process is not particularly limited, and a publicly-known drying method can be employed. The publicly-known drying method includes, for example, an indirect heating and drying method. An example of the indirect heating and drying method is a method using an indirect heating rotary drier. This method includes supplying a heat gas into a space between an outer tube and an inner tube of a rotary kiln-shaped dual-tube structure provided in the indirect heating rotary drier to heat and dry a granulated carbon black raw material containing water content placed in the inner tube at a predetermined temperature.

The carbon black is produced through the steps described above.

Here, for example, the properties of the carbon black to be obtained can be controlled by adjusting the reaction conditions in reaction step S1.

For example, when the amount of the alkali metal salt·aqueous solution to be introduced is increased in reaction step S1, the value of the DBP absorption number decreases. Thus, a desired DBP absorption number can be achieved by adjusting the amount of the alkali metal salt·aqueous solution to be introduced.

In addition, when the amount of the oxygen-containing gas to be introduced is increased or the amount of the raw material oil to be introduced is reduced in reaction step S1, the value of $N_2SA$ increases. Thus, a desired $N_2SA$ can be achieved by adjusting the amount of the oxygen gas to be introduced or the amount of the raw material oil to be introduced.

In addition, when the reaction time from when the raw material oil is introduced to when the reaction is stopped by rapid cooling is shortened, the value of $N_2SA/IA$ increases. Thus, a desired $N_2SA/IA$ can be achieved by adjusting this reaction time.

In addition, the hydrogen content by NMR and ΔD (crystallinity) depend on the reaction temperature and the residence time in the reaction zone 9. Thus, a desired hydrogen content by NMR and ΔD can be achieved by introducing a coolant such as an inert gas such as nitrogen, a heavy oil having a specific gravity of less than 1.0 (A heavy oil, B heavy oil, or C heavy oil), a light hydrocarbon (gasoline, diesel oil, kerosene, or the like), or water vapor into the reaction zone 9 (having an in-furnace temperature of 1000° C. or more) between the raw material inlet zone 6 and the cooling liquid inlet nozzle 8 through the coolant inlet nozzle 7 in FIG. 1 while adjusting the amount to be added such that the reaction temperature in the reaction zone 9 becomes 800 to 900° C., and further stopping the reaction by quenching (rapid cooling using water spraying) such that the residence time (between the nozzle 7 and the nozzle 8) becomes 20 to 30 msec.

EXAMPLES

Hereinafter, Examples will be described for explaining the present invention in further detail. However, the present invention should not be construed as being limited to Examples described below.

Examples 1 to 12, Comparative Examples 1 to 10

A carbon black according to an embodiment of the present invention was produced in accordance with the procedure of the processing steps shown in FIG. 4. First, in reaction step S1, a reaction furnace having the configuration illustrated in FIG. 5 was used and carbon black raw materials having different properties were generated while whether or not to introduce the coolant to the reaction zone 9 through the coolant inlet nozzle 7, the reaction temperature in the reaction zone 9, and the residence time until the stop of the reaction were changed.

Examples 1 to 12

Carbon black raw materials were produced while nitrogen was introduced to the reaction zone 9 between the raw material oil inlet nozzle 5 and the cooling liquid inlet nozzle 8 through the coolant inlet nozzle 7, and the reaction temperature was adjusted to 800 to 900° C. and the residence time until the stop of the reaction by the cooling liquid inlet nozzle 8 was adjusted to 20 to 30 msec.

Comparative Example 1

A carbon black raw material was produced while nitrogen was introduced to the reaction zone 9 between the raw material oil inlet nozzle 5 and the cooling liquid inlet nozzle 8 through the coolant inlet nozzle 7, and the reaction temperature was adjusted to 800 to 900° C. and the residence time until the stop of the reaction by the cooling liquid inlet nozzle 8 was adjusted to less than 20 msec.

Comparative Examples 2, 3, and 7 to 9

Carbon black raw materials were produced while nitrogen was not introduced to the reaction zone 9 through the coolant inlet nozzle 7.

Comparative Example 4

A carbon black raw material was produced while nitrogen was introduced to the reaction zone 9 between the raw material oil inlet nozzle 5 and the cooling liquid inlet nozzle 8 through the coolant inlet nozzle 7, and the reaction temperature was adjusted to less than 800° C. and the residence time until the stop of the reaction by the cooling liquid inlet nozzle 8 was adjusted to 20 to 30 msec.

Comparative Example 5

A carbon black raw material was produced while nitrogen was introduced to the reaction zone 9 between the raw material oil inlet nozzle 5 and the cooling liquid inlet nozzle 8 through the coolant inlet nozzle 7, and the reaction temperature was adjusted to more than 900° C. and the residence time until the stop of the reaction by the cooling liquid inlet nozzle 8 was adjusted to 20 to 30 msec.

Comparative Example 6

A carbon black raw material was produced while nitrogen was introduced to the reaction zone 9 between the raw material oil inlet nozzle 5 and the cooling liquid inlet nozzle 8 through the coolant inlet nozzle 7, and the reaction temperature was adjusted to 800 to 900° C. and the residence time until the stop of the reaction by the cooling liquid inlet nozzle 8 was adjusted to more than 30 msec.

Comparative Example 10

A carbon black having a nitrogen adsorption specific surface area ($N_2SA$) of more than 60 m²/g was produced by adjusting and reducing the amount of the raw material hydrocarbon while nitrogen was introduced to the reaction zone 9 between the raw material oil inlet nozzle 5 and the cooling liquid inlet nozzle 8 through the coolant inlet nozzle 7, and the reaction temperature was adjusted to 800 to 900° C. and the residence time until the stop of the reaction by the cooling liquid inlet nozzle 8 was adjusted to 20 to 30 msec.

Subsequently, each carbon black raw material obtained in reaction step S1 was subjected to wet granulation process under certain conditions in granulation step S2. In this way, carbon blacks according to Examples 1 to 12 and Comparative Examples 1 to 10 were obtained.

For each of Examples 1 to 12 and Comparative Examples 1 to 10 thus obtained, whether or not to introduce nitrogen through the coolant inlet nozzle 7, the temperature of the reaction zone 9 of the intermediate point between the coolant inlet nozzle 7 and the cooling liquid inlet nozzle 8, the residence time at the intermediate point between the coolant inlet nozzle 7 and the cooling liquid inlet nozzle 8, $N_2SA$, $N_2SA/IA$, the DBP absorption number, the hydrogen content by NMR, and ΔD were measured. Results are shown in Table 1-1, Table 1-2, and Table 2.

Subsequently, 40 parts by mass of the carbon black according to each of Examples and Comparative Examples was added to 100 parts by mass of NBR rubber, and the rubber composition was prepared. The physical properties of the prepared. rubber composition were measured. The measured physical properties and measuring methods are as described below.

Durometer Hardness Hs

The hardness Hs was measured by using a type-A durometer in accordance with JIS K 6253-3-2012 (Rubber, vulcanized or thermoplastic—Determination of hardness).

Tensile Strength TB

The tensile strength at break TB (MPa) was measured in accordance with JIS K 6251-2017 (Rubber, vulcanized or thermoplastic—Determination of tensile stress-strain properties).

Elongation EB

The elongation at break EB (%) was measured in accordance JIS K 6251-2017 (Rubber, vulcanized or thermoplastic—Determination of tensile stress-strain properties).

Tensile Product TB×EB

The tensile product (TB×EB) was calculated based on the TB and EB obtained as described above.

Payne Effect Value

The dynamic modulus (E'(0.1)) at a strain of 0.1% was measured under conditions of 50 Hz and 60° C. by using viscoelastic spectrometer VR-7110 (manufactured by Ueshima Seisakusho Co., Ltd.). In addition, the dynamic modulus (E'(2.0)) at a strain of 2.0% was also measured. Then, the difference between these (E'(0.1)-E'(2.0)) was calculated as the Payne effect value. In the dynamic viscoelasticity of the rubber blended with the carbon black, the dynamic modulus at a low strain region greatly depends on the aggregation property among particles of the carbon black, while the dependency of the dynamic modulus at a high strain region on the aggregation property is smaller because the particles of the carbon black are separated by a forcible external force due to the elongation of the rubber, and the dependency of the dynamic modulus of the rubber itself blended with no carbon black becomes high. Hence, a lower value of the difference (Payne Effect) in dynamic modulus between a low strain region and a high strain region indicates a lower aggregation property among particles of the carbon black in a micro region of the rubber, that is, a higher dispersibility of the carbon black in the micro region.

Dispersion

The occupational area of non-dispersed lumps of the carbon black of 3 μm or more in a certain view was measured by using a disperGRADER α view SR manufactured by Alpha Technologies in accordance with ASTM D7723 to obtain dispersion (%). Unlike the value of the Payne Effect, this dispersion indicates the dispersibility of the carbon black in a macro region. A smaller value of the dispersion indicates a higher dispersibility in the macro region.

Study

Results are shown in Table 1-1, Table 1-2, and Table 2. Examples 1 to 12 are those of which the nitrogen adsorption specific surface area ($N_2SA$), the $N_2SA/IA$, the DBP absorption number, the hydrogen content by NMR, and the ΔD were within the above-described specific ranges. On the other hand, Comparative Examples 1 to 10 are those of which the production condition and/or at least one of the above-described properties were out of the corresponding specific ranges.

Examples 1 to 12 each had a larger tensile product (TB×EB) than those of Comparative Examples 1 to 10. That is, it was understood that the rubber member blended with the carbon black according to each of Examples 1 to 12 was more likely to be elongated and had higher strength.

In addition, Examples 1 to 12 each had a lower Payne Effect value and a higher dispersion than those of Comparative Examples 1 to 10. From this, it was considered that the carbon black according to each of Examples 1 to 12 not only had a higher dispersibility in the macro region but also had a higher dispersibility in the micro region as well, which allowed a higher reinforcement to be achieved.

As described above, it was found that it was possible to obtain a carbon black having excellent dispersibility not only in the macro region but also in the micro region by setting the nitrogen adsorption specific surface area ($N_2SA$), the DBP absorption number, $N_2SA/IA$, the hydrogen content by NMR, and the ΔD within the specific ranges, and consequently to significantly improve the tensile product of the rubber member as compared with the conventional techniques.

TABLE 1-1

| Example | 1 | 2 | 3 | 4 | 5 | 6 | 7 | 8 | 9 |
|---|---|---|---|---|---|---|---|---|---|
| Introduction of nitrogen through the nozzle 7 | Yes | Yes | Yes | Yes | Yes | Yes | Yes | Yes | Yes |
| Temperature in the reaction zone 9 (° C.) (the intermediate point between the nozzles 7 and 8) | 820 | 800 | 870 | 850 | 840 | 900 | 880 | 820 | 830 |
| Residence time between the nozzles 7 and 8 (msec) | 22 | 26 | 30 | 25 | 23 | 21 | 25 | 29 | 22 |
| $N_2SA$ (m²/g) | 27 | 48 | 56 | 37 | 46 | 51 | 58 | 41 | 34 |
| $N_2SA/IA$ (×10³) (m²/g) | 1.21 | 1.23 | 1.44 | 1.32 | 1.31 | 1.15 | 1.29 | 1.48 | 1.17 |
| DBP absorption number (cm³/100 g) | 152 | 120 | 103 | 136 | 140 | 166 | 173 | 143 | 96 |
| Hydrogen content by NMR (/g) | 156 | 165 | 196 | 215 | 195 | 225 | 225 | 240 | 179 |
| ΔD (cm⁻¹) | 272 | 278 | 275 | 285 | 264 | 282 | 272 | 288 | 269 |
| Hs (—) | 48 | 47 | 49 | 47 | 49 | 47 | 51 | 47 | 50 |
| TB (MPa) | 16.8 | 17.9 | 17.7 | 16.7 | 16.6 | 17.1 | 17.5 | 18.3 | 17.2 |
| EB (%) | 680 | 640 | 670 | 750 | 720 | 770 | 640 | 700 | 640 |
| TB × EB (×100) | 114 | 115 | 119 | 125 | 119 | 131 | 112 | 128 | 110 |

TABLE 1-1-continued

| | | | | | | | | | |
|---|---|---|---|---|---|---|---|---|---|
| E' 50 Hz, ε = 0.1%, 60° C. (MPa) | 3.8 | 4.4 | 4.0 | 4.2 | 4.4 | 4.4 | 4.5 | 4.2 | 4.1 |
| E' 50 Hz, ε = 2.0%, 60° C. (MPa) | 3.1 | 3.3 | 3.2 | 3.3 | 3.4 | 3.6 | 3.6 | 3.5 | 3.1 |
| Payne Effect: E'(0.1) − E'(2.0) (MPa) | 0.7 | 1.1 | 0.8 | 0.9 | 1.0 | 0.8 | 0.9 | 0.7 | 1.0 |
| Dispersion (%) | 95.3 | 84.6 | 88.7 | 93.2 | 85.6 | 95.3 | 93.1 | 95.1 | 85.6 |

TABLE 1-2

| Example | 10 | 11 | 12 |
|---|---|---|---|
| Introduction of nitrogen through the nozzle 7 | Yes | Yes | Yes |
| Temperature in the reaction zone 9 (° C.) (the intermediate point between the nozzles 7 and 8) | 830 | 870 | 810 |
| Residence time between the nozzles 7 and 8 (msec) | 27 | 25 | 30 |
| $N_2SA$ ($m^2$/g) | 39 | 51 | 33 |
| $N_2SA/IA$ (×$10^3$) ($m^2$/g) | 1.34 | 1.38 | 1.43 |
| DBP absorption number ($cm^3$/100 g) | 125 | 117 | 140 |
| Hydrogen content by NMR (/g) | 160 | 185 | 216 |
| ΔD ($cm^{-1}$) | 275 | 285 | 272 |
| Hs (—) | 49 | 48 | 48 |
| TB (MPa) | 18.8 | 19.2 | 17.2 |
| EB (%) | 750 | 800 | 700 |
| TB × EB (×100) | 141 | 154 | 120 |
| E' 50 Hz, ε = 0.1%, 60° C. (MPa) | 4.3 | 4.4 | 4.2 |
| E' 50 Hz, ε = 2.0%, 60° C. (MPa) | 3.7 | 4.0 | 3.5 |
| Payne Effect: E'(0.1) − E'(2.0) (MPa) | 0.6 | 0.4 | 0.7 |
| Dispersion (%) | 97.2 | 96.3 | 99.2 |

TABLE 2

| Comparative Example | 1 | 2 | 3 | 4 | 5 | 6 | 7 | 8 | 9 | 10 |
|---|---|---|---|---|---|---|---|---|---|---|
| Introduction of nitrogen through the nozzle 7 | Yes | No | No | Yes | Yes | Yes | No | No | No | Yes |
| Temperature in the reaction zone 9 (° C.) (the intermediate point between the nozzles 7 and 8) | 850 | 1100 | 1050 | 770 | 930 | 880 | 1080 | 1150 | 1120 | 870 |
| Residence time between the nozzles 7 and 8 (msec) | 17 | — | — | 25 | 27 | 38 | — | — | — | 27 |
| $N_2SA$ ($m^2$/g) | 36 | 53 | 23 | 49 | 42 | 56 | 50 | 63 | 55 | 70 |
| $N_2SA/IA$ (×$10^3$) ($m^2$/g) | 1.24 | 1.39 | 1.44 | 1.29 | 0.95 | 0.90 | 1.16 | 1.29 | 1.06 | 1.30 |
| DBP absorption number ($cm^3$/100 g) | 124 | 80 | 135 | 133 | 113 | 158 | 185 | 148 | 104 | 130 |
| Hydrogen content by NMR (/g) | 168 | 69 | 196 | 67 | 89 | 106 | 114 | 132 | 178 | 140 |
| ΔD ($cm^{-1}$) | 250 | 255 | 256 | 233 | 243 | 250 | 246 | 273 | 276 | 262 |
| Hs (—) | 50 | 51 | 49 | 50 | 50 | 50 | 49 | 47 | 48 | 48 |
| TB (MPa) | 14.7 | 14.0 | 13.0 | 14.6 | 15.2 | 15.7 | 15.4 | 15.2 | 13.3 | 15.8 |
| EB (%) | 580 | 550 | 700 | 670 | 670 | 620 | 540 | 560 | 560 | 600 |
| TB × EB (×100) | 85 | 77 | 91 | 98 | 102 | 97 | 83 | 85 | 74 | 95 |
| E' 50 Hz, ε = 0.1%, 60° C. (MPa) | 6.0 | 7.3 | 5.7 | 5.9 | 5.5 | 5.5 | 5.5 | 6.3 | 6.0 | 5.3 |
| E' 50 Hz, ε = 2.0%, 60° C. (MPa) | 3.5 | 4.0 | 3.4 | 3.9 | 3.9 | 3.7 | 3.5 | 3.5 | 3.2 | 3.7 |
| Payne Effect: E'(0.1) − E'(2.0) (MPa) | 2.5 | 3.3 | 2.3 | 2.0 | 1.6 | 1.8 | 2.0 | 2.8 | 2.8 | 1.6 |
| Dispersion (%) | 73.9 | 71.0 | 74.9 | 72.0 | 78.0 | 74.0 | 68.6 | 57.3 | 53.7 | 66.8 |

REFERENCE SIGNS LIST 1 oxygen-containing gas inlet port
2 combustion burner
3 alkali metal salt·aqueous solution supply nozzle
4 fuel combustion zone
5 raw material oil inlet nozzle
6 raw material inlet zone
7 coolant inlet nozzle
8 cooling liquid inlet nozzle
9 reaction zone
10 reaction furnace

What is claimed is:

1. A carbon black wherein
   a nitrogen adsorption specific surface area ($N_2SA$) of the carbon black is 25 to 60 $m^2$/g,
   a DBP absorption number of the carbon black is 90 to 180 $cm^3$/100 g,
   a ratio of the nitrogen adsorption specific surface area ($N_2SA$) to an iodine adsorption number (IA) ($N_2SA$/IA) of the carbon black is $1.10 \times 10^3$ to $1.50 \times 10^3$ $m^2$/g,
   when a nuclear magnetic resonance signal of a spin-spin relaxation process observed by a solid echo method is represented by a sum of a first signal and a second signal having a larger time constant than that of the first signal, a hydrogen content of the carbon black represented by a signal intensity per unit mass at time 0 of the first signal is 150 to 250/g, and
   when an excitation wavelength of the carbon black is set at 532 nm, a full width at half maximum ΔD of a Raman scattering peak appearing within a range of 1340 to 1360 $cm^{-1}$ is 260 to 290 $cm^{-1}$.

2. The carbon black according to claim 1, wherein the DBP absorption number is 90 to 150 $cm^3$/100 g.

3. The carbon black according to claim 1, wherein the $N_2SA$/IA is $1.20 \times 10^3$ to $1.50 \times 10^3$ $m^2$/g.

4. The carbon black according to claim 1, for a filler for a rubber member.

5. The carbon black according to claim 4, that is to be added in an amount of 10 to 170 parts by mass relative to 100 parts by mass of a rubber component in the rubber member.

* * * * *